Aug. 5, 1924.                                              1,504,195
D. G. F. WHITE ET AL
VALVULAR ARRANGEMENT OF INTERNAL COMBUSTION ENGINES
Filed July 12, 1923        3 Sheets-Sheet 1

Inventors

Patented Aug. 5, 1924.

1,504,195

UNITED STATES PATENT OFFICE.

DOUGLAS GEORGE FISHER WHITE, OF NEWTON ABBOT, ENGLAND, AND LYON WILSON NEILSON, OF GLASGOW, SCOTLAND.

VALVULAR ARRANGEMENT OF INTERNAL-COMBUSTION ENGINES.

Application filed July 12, 1923. Serial No. 651,158.

*To all whom it may concern:*

Be it known that we, DOUGLAS GEORGE FISHER WHITE, of 6 Courtenay Street, Newton Abbot, in the county of Devon, England, and LYON WILSON NEILSON, of 76 Netherlee Road, Cathcart, Glasgow, in the county of Renfrew, Scotland, have invented certain new and useful Improvements in Connection with Valvular Arrangements of Internal-Combustion Engines, of which the following is a specification.

Our invention relates to improvements in connection with valvular arrangements of internal combustion engines, working on the four stroke principle, and of the kind wherein the valvular arrangements comprise a poppet valve or valves which is opened at the proper times for the induction and exhaust periods, and closed during the proper times for compression and firing periods, and this said poppet valve operates in a pocket formed for its accommodation, and controls a port to and from the cylinder, which port is put into communication at the proper times with induction and exhaust passages, the ports of which are controlled by two rotary valves, one of which is for exhaust and the other for induction, and has for its object, the provision of an improved construction of such valvular arrangements which shall combine simplicity and accessibility and ensure the maximum efficiency of the engine as a direct result of cutting down to the minimum the volume of the previously mentioned pocket, and of practically eliminating all passages or ducts in which residual gases could lodge. The durability and longevity of the valves are assured, there being no high temperature or inertia stresses set up in or by the valve gear.

According to our invention, the said rotary valves, together with their ports are suitably arranged as close as is practicable to the said poppet valve stem and head, in such a way, and in order that the inert and residual gases left in the aforesaid pocket formed for the aforementioned poppet valve head shall be of the minimum possible volume, and further, this pocket volume is not increased owing to the practical elimination of any ducts or passages for induction and exhaust between the port to and from the cylinder and the ports to the induction and exhaust passages wherein residual gases could lodge, communication for induction and exhaust being effected by means of the ports which give access to the aforementioned pocket, these ports being directly incorporated in the wall of the said pocket formed for the accommodation of the said poppet valve head. The said rotary valves are so operated and arranged that, when the said poppet valve is opened for the exhaust period, the aforesaid rotary valve which controls the port to the exhaust passage is open, and the other said rotary valve which controls the port to the inner passage is closed, and the said poppet valve, remaining open for the induction stroke, the rotary valve controlling the port to the inlet passage is open, while the aforesaid rotary valve controlling the port to the exhaust passage is closed. These said rotary valves are arranged one on either side of the said poppet valve, and as close as is practicable to its stem and head, their axes preferably being parallel to one another. Further these said rotary valves are so arranged in their positions and directions of rotation that, (1) any passage or passages between the port to and from the cylinder controlled by the poppet valve, and the ports to the inlet and exhaust passages controlled by the said rotary valves are practically eliminated. The only means of communication between the port to the inlet passage and the port to and from the cylinder, and the port to the exhaust passage and the port to and from the cylinder is through the actual and minimum pocket formed for the accommodation of the head of the said poppet valve, the ports to the inlet and exhaust passages being incorporated in the actual walls of the aforesaid pocket, and that (2) between the exhaust and induction strokes of the cycle the gap or recess in these said rotary valves which are D-shaped in section do not increase the volume of residual gases left above the port to and from the cylinder to a greater extent than that of the minimum pocket volume, and that (3) these said rotary valves are balanced, i. e., the centrifugal force of one equals the centrifugal force of the other, and by virtue of these running in opposite directions the two forces are balanced, and that (4) the incoming charge is given direction by the cooler flat gap or recess of the aforesaid inlet rotary valve before it impinges on any hot spot other than where it is required to impinge for the most efficient running of the engine, that is, on the head and stem of the aforesaid poppet valve, and that (5) the exhaust gases are not given direction by, and do not impinge on the rotary valve controlling the exhaust function, thus permitting of a free exhaust and the best possible streamline flow of exhaust gas. The exhaust gases are never in contact with the flat gap of the inlet rotor or any part of the inlet rotor casing during the exhaust function.

In the case of engines of say more than 1250 c. c. per cylinder, more than one poppet valve may be used for controlling ports to and from the cylinder, if, by so doing, the volume of the actual and minimum pocket formed for the heads of these poppet valves be of less volume than would be the case were a single poppet valve used, for it is a mathematical fact that the lip efficiency of one poppet valve is less than the lip efficiency of multiple poppet valves which are used for performing the same function as one poppet valve.

The foregoing description applies to a single cylinder engine cooled by air, oil, water or other means or to an engine cooled by air, water, oil or other means having two or more cylinders cast or constructed separately. In the case of an engine cooled by air, water, oil or other means having two or more cylinders cast or constructed "en bloc," the axes of the rotary valves will preferably be in a plane which is parallel to the engine shaft, in which case they may be constructed singly and suitably connected the one with the other, or two or more may be integrally constructed with a common axial centre line, and a series of these integral constructions of rotary valves may be suitably connected with other series of the same, while if the axes of these said rotary valves are at right angles, or at any other angle to the engine shaft, then one inlet or one exhaust rotor may control respectively the inlet or exhaust functions of two adjacent cylinders, and these said rotary valves will preferably be constructed singly, working together in every case with a poppet valve for controlling the port to and from each cylinder, the whole being so arranged and suitably operated that the pocket formed for the head of the aforementioned poppet valve has the minimum possible volume, and that any ducts or passages for induction and exhaust between the port to and from the cylinder and the ports to the inlet and exhaust passages are practically eliminated by virtue of these ports being incorporated in the actual pocket wall.

In direct communication with the cylinder at the end where exhaust and induction takes place, are valve casings consisting of a casting adapted to be secured by bolts, studs, or other suitable means to the end of the cylinder, incorporating preferably the combustion chamber or a part thereof, and comprising the port to and from the cylinder, a pocket formed for the head of the previously mentioned poppet valve, and directly in the wall of which minimum pocket are situated the exhaust port and the induction port which give access to two housings or circular seatings formed for the accommodation of the previously mentioned rotary valves, and a seating for the poppet valve, and also a guide for the said poppet valve. The said poppet valve is suitably operated at the proper times by a rocking lever acted upon by any convenient type of cam, and though we have shown a surface cam, we do not commit or confine ourselves to this particular type and this cam may or may not be conveniently mounted on the spindle of one of the said rotary valves. The whole, together with the said rotary valves is conveniently driven and operated by any suitable gear or gearing from the driving shaft of the engine or in any other convenient manner.

A portion is cut away from the body of each of the aforesaid rotary valves of necessary width to give free passage to the gases, and of a suitable segmental depth that, by reason of their rotary motion, they give the required period of opening and closing to their respective parts. The aforesaid rotary valves are preferably of hollow open-ended D-section, in which hollow D-section a suitable vane or vanes may be incorporated and an air scoop may also be incorporated on one end of each rotor, and by virtue of their rotary motion induces air to pass through the hollow D-section longitudinally for internal cooling purposes. Suitable bearings are provided for the spindles of these said rotary valves, in such a way that the rotary valves are held clear of their respective casings in which they revolve, these bearings shall preferably be mounted in the casting on suitably gapped pedestal housings thereby restricting the possible heat path to the bearings and also allowing a flow of air, induced by the vaning and scoop, around and under each bearing and through the actual rotary valves. Toward the outer ends of each of these said rotary valves, a suitable form of packing, which may preferably be one or more spring rings, shall be incorporated in order that air may not be drawn past the outer ends of the rotary valves during the suction stroke of the cycle.

In order that our invention may be properly understood and readily carried into effect, we have hereunto appended three sheets of drawings, of which—

Figure 1 shows a vertical section of so much of an internal combustion engine as is necessary in order that the application of our invention thereto may be shown. In the position shown, the exhaust stroke has just ended, and the induction stroke is about to commence, and the figure illustrates how the dead or inert gas space is not increased between the exhaust and induction strokes, and the entire elimination of all ducts or passages between the port to and from the cylinder and the ports to the inlet and exhaust passages.

Figure 1:
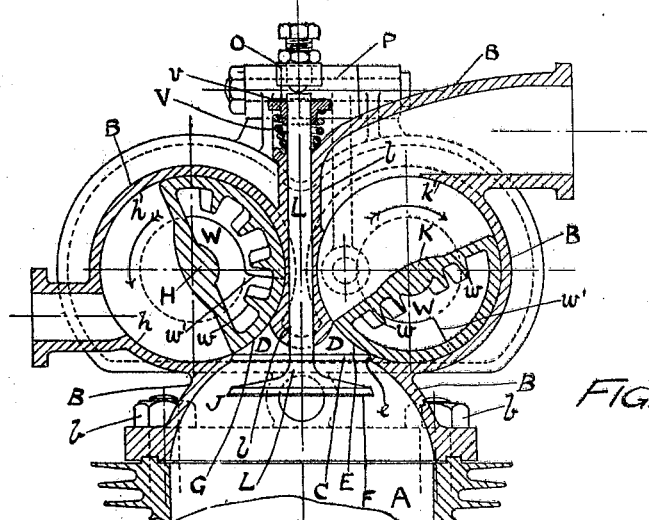
Figure 2:
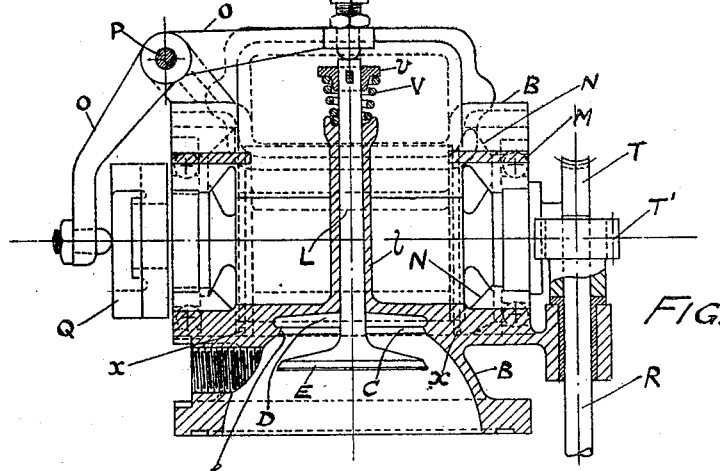
Figure 2 is a longitudinal section through the centre line of the poppet valve pocket.
Figure 3:
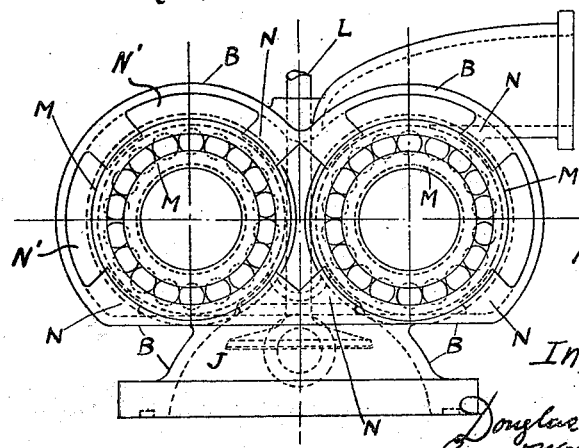
Figure 3 is an outside end view showing the ballrace bearings in their pedestal housings.
Figure 4:
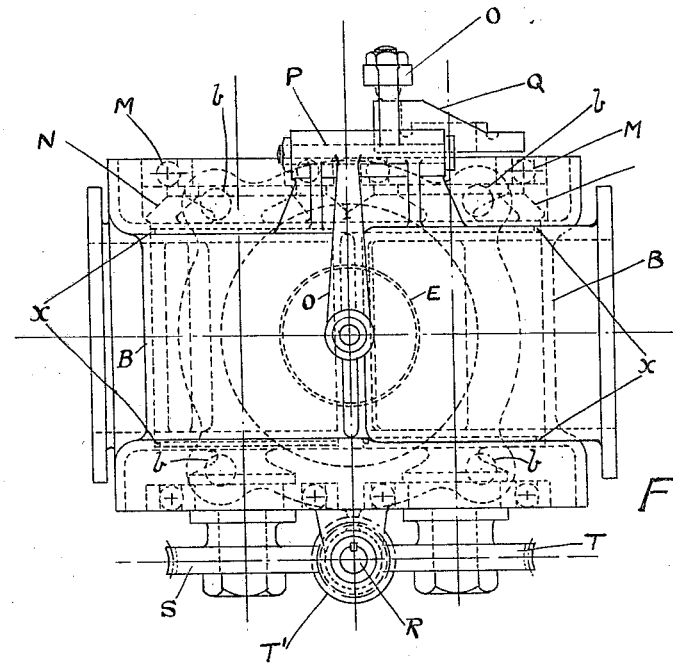
Figure 4 is an outside plan view.
Figure 5:
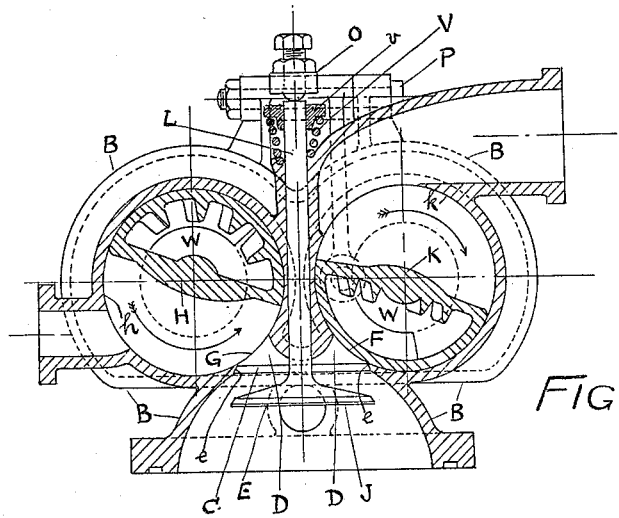
Figures 5 and 6 are also vertical sections similar to Figure 1, but show respectively a position during the induction stroke, and a position during the exhaust stroke.
Figure 6:
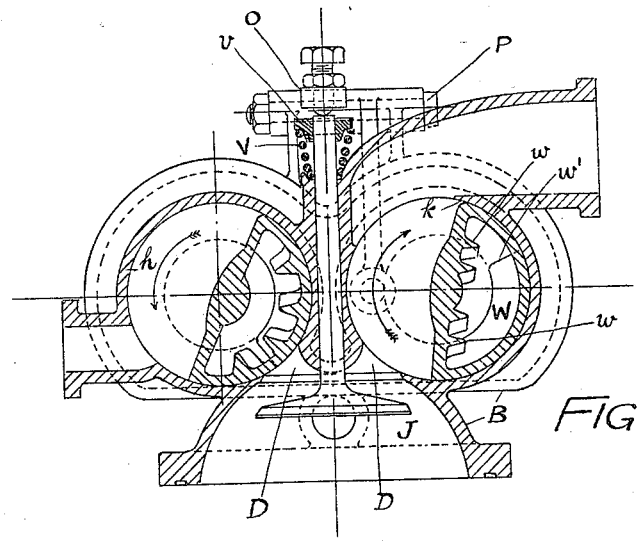
Figure 7:
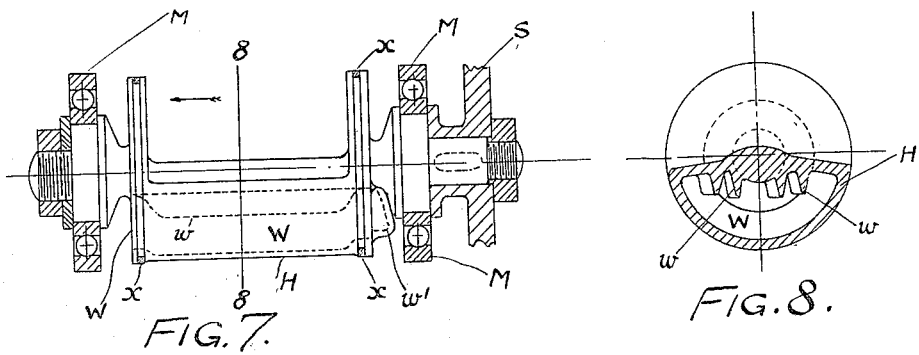
Figures 7 and 8 show respectively, an outside view of a rotary valve and a transverse section through the line 8—8 of the same rotary valve.
Figure 8:
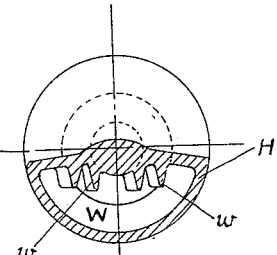

In the construction according to our invention there are in direct communication with the cylinder A at the end where exhaust and induction takes place, valve casings consisting of a casting B, in which is preferably incorporated part or whole of the combustion chamber J, the whole being adapted to be secured by bolts, studs or other suitable means marked b to the end of the cylinder A, and comprising the port C to and from the cylinder A, the pocket D formed for the head of the poppet valve E, the exhaust port F and the induction port G, and also two housings or circular seatings h and k for the rotary valves H and K, and a seating e for the poppet valve E, and a guide l for the stem L of the poppet valve E. The said rotary valves H and K with the ports G and F, which they control, are arranged and operated as close as is practicable to the stem L of the said poppet valve E and to the port C, in order that the volume of the said pocket D formed for the accommodation of the head of the poppet valve E shall be at its minimum and that all passages or ducts between the port C to and from the cylinder A and the port G to the inlet passage and the port F to the exhaust passages are entirely eliminated, by virtue of the ports F and G being incorporated in the actual wall of the said pocket D, and also to effect a better scavenge and avoid impingement of the hot gases on the rotary valve K, because at the period of exhausting the said rotary valve K is in such a position that its gapped face avoids the direct flow of exhaust gases. In operation the poppet valve E is opened by an operating lever O pivoted at P and acted upon by a cam Q which is shown mounted on the axis of the rotary valve K. The rotary valves H and K are driven by any suitable gear from the driving shaft of the engine such as a shaft R, mounted on which is the gear wheel T' meshing with the gear wheels S and T, these being suitably mounted and secured on the axes of the rotary valves H and K. The poppet valve E is closed by the action of a spring V upon a collar piece v attached to the stem L. The rotary valves H and K are of hollow open ended D-section as shown by W, in which said D-section may preferably be constructed suitable vanes w and at one end of each rotary valve may be an air scoop w'. The spindles of the said rotary valves H and K are carried in bearings M and these bearings are preferably mounted in the casting B on pedestal housings N, having gaps N' in order that the heat path to these said pedestal bearings may be restricted and that in the case of air cooled engines air may be induced by the vaning w and the scoop w' through gaps N' in the aforesaid housings N for the said bearings M, and through the hollow D-section W. In order that air may not be drawn past the outer ends of the rotary valves H and K during the suction stroke of the engines, these said rotary valves which have their axes preferably parallel to the engine shaft, are provided at each of their ends with packing ring x.

Figure 9:
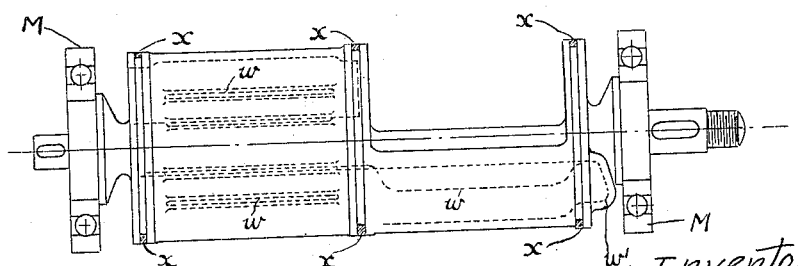
Figure 9 shows an outside view of an integral construction of rotary valves with their bearings.

The invention can be employed in engines having one or more than one cylinder and in the case of two or more cylinders being constructed "en bloc" Figure 9 illustrates an integral construction of rotary valves which it is preferred will be employed in connection with other integral constructions of the same, and the axes of these rotary valves will preferably be parallel to the engine shaft.

We claim as our invention:

1. In an internal combustion engine a cylinder, a head thereon having a casing providing a poppet valve opening and seat, and also providing a pair of cylindrical valve housings, each having a port arranged in communication with said valve seat, one of said housings having an induction port and the other having an exhaust port, a poppet valve to open and close said valve seat, a pair of cylindrical rotary valves one in each of said housings, and respectively arranged to open and close communication between the cylinder and the inlet and exhaust, and bearings for the said rotary valves, said bearings having air gaps therein, and said valves having means cooperating with said air gaps to cause air to circulate around and cool said bearings.

2. In an internal combustion engine a cylinder, a head thereon having a casing providing a poppet valve opening and seat, and also providing a pair of cylindrical valve housings, each having a port arranged in communication with said valve seat, one of said housings having an induction port and the other having an exhaust port, a poppet valve to open and close said valve seat, a pair of cylindrical rotary valves one in each of said housings, and respectively arranged to open and close communication between the cylinder and the inlet and exhaust, and bearings for the said rotary valves, said bearings having air gaps therein, and said valves having each an air scoop and a vane to cause the air to circulate around and cool said bearings.

In testimony whereof we affix our signatures in presence of two witnesses.

DOUGLAS GEORGE FISHER WHITE.
LYON WILSON NEILSON.

Witnesses:
    JOHN LIDDLE,
    JOHN TRAIN LIDDLE.